United States Patent
Kamauchi et al.

[11] Patent Number: 5,989,745
[45] Date of Patent: Nov. 23, 1999

[54] LITHIUM SECONDARY BATTERY

[75] Inventors: Masahiro Kamauchi; Yoshinori Takada, both of Itami, Japan

[73] Assignee: Mitsubishi Cable Industries, Ltd., Amagasaki, Japan

[21] Appl. No.: 09/037,705

[22] Filed: Mar. 10, 1998

Related U.S. Application Data

[62] Division of application No. 08/849,192, filed as application No. PCT/JP95/02397, Nov. 24, 1995.

[30] Foreign Application Priority Data

Nov. 28, 1994 [JP] Japan ................................. 6-293118

[51] Int. Cl.$^6$ ........................................................ H01M 4/52
[52] U.S. Cl. ........................ 429/223; 429/231.1; 423/594; 423/641
[58] Field of Search .................... 429/218.1, 223, 429/231.1, 219; 423/306, 594, 641

[56] References Cited

U.S. PATENT DOCUMENTS

| | | | |
|---|---|---|---|
| 5,244,757 | 9/1993 | Takami et al. | 429/218 |
| 5,286,582 | 2/1994 | Tahara et al. | 429/194 |
| 5,378,560 | 1/1995 | Tomiyama et al. | 429/217 |
| 5,401,599 | 3/1995 | Tahara et al. | 429/218 |
| 5,498,495 | 3/1996 | Takada et al. | 429/219 |
| 5,718,989 | 2/1998 | Aoki et al. | 429/218 |
| 5,750,288 | 5/1998 | Xie et al. | 429/229 |
| 5,783,333 | 7/1998 | Mayer | 429/223 |
| 5,795,558 | 8/1998 | Aoki et al. | 423/594 |
| 5,804,335 | 9/1998 | Kamauchi et al. | 429/218 |

FOREIGN PATENT DOCUMENTS 56-73860 6/1981 Japan .
59-228370 12/1984 Japan .

OTHER PUBLICATIONS

International Search Report in PCT/JP95/02397 mailed Mar. 26, 1996.

*Primary Examiner*—Maria Nuzzolillo
*Assistant Examiner*—Carol Chaney
*Attorney, Agent, or Firm*—Varndell & Varndell,PLLC

[57] ABSTRACT

A lithium secondary battery comprising a positive electrode composed of a positive electrode active material comprising an oxide compound comprising at least Li and Ni, and a negative electrode comprising an Li—Ag—Te alloy, a positive electrode active material for a lithium secondary battery, which is composed of an oxide compound represented by the formula:

$$LiNi_wAl_xP_yO_z$$

wherein $0.80 < w < 1.10$, $0 < x < 0.015$, $0 < y < 0.03$ and $1.8 \leq z \leq 2.2$, and a lithium secondary battery comprising said positive electrode active material. The lithium secondary battery of the present invention shows large charge-discharge capacity, high energy density, less degradation by the repetitive charge-discharge and is superior in cycle property. The positive electrode active material of the present invention, which is composed of an oxide compound represented by the formula $LiNi_wAl_xP_yO_z$ is economical and superior in the supply of starting materials, and the lithium secondary battery comprising said positive electrode active material is advantageous in that it has high capacity, is superior in cycle property and can be prepared stably at low costs.

5 Claims, 4 Drawing Sheets

FIG. 4 ical field

The present invention relates to a lithium secondary battery having high capacity and superior cycle property, a positive electrode active material to be used for lithium secondary battery, and to a positive electrode material compound.

BACKGROUND ART

In general, a lithium secondary battery is required to have (1) high energy density (2) high output density (3) small self discharge ratio (4) economical aspect (5) high energy efficiency and (6) long cycle life.

As a secondary battery having such properties, a non-aqueous electrolyte battery utilizing an electric energy produced by the migration of lithium ions, i.e., so-called lithium secondary battery, is known to have high voltage and high energy density.

A lithium secondary battery comprising pure lithium as a negative electrode material can achieve high energy density of the negative electrode, whereas it suffers from a tendency to grow dendrite. An electrodeposition of metals generally proceeds in two steps of migration of metallic ions to the electrode surface (i.e. diffusion) and receipt and release of electrons at the electrode (i.e. electrode reaction). In the electrodeposition of pure lithium, the electrode reaction proceeds quickly and the speed of lithium diffusing toward the electrode surface determines the rate of electrodeposition. An electrodeposition wherein the rate is determined by such mass migration often suffers from the growth of dendrite. The dendrite is a branch-like crystal which grows quickly once formed, and penetrates a separator, as a result of which it causes short-circuit between the negative electrode and the positive electrode. Consequently, problems are caused which are undesirable in terms of safety, such as combustion, markedly short cycle life of the battery and poor cycle property.

On the other hand, a negative electrode composed of a lithium alloy comprising an intermetallic compound of Li and Al, Bi, Pb, Sn, In or the like is known to suppress deposition of lithium in a dendrite state, since the speed of absorption of lithium in the negative electrode becomes higher. However, this also poses problems in that the negative electrode becomes weak, so that it develops cracks through swelling and contraction in volume which occur along with the absorption and release of lithium, to ultimately result in pulverulent negative electrode, and that the electromotive force of the battery decreases due to a higher potential of the electrode than that possessed by the negative electrode composed of pure lithium.

In an attempt to provide a lithium secondary battery free from such problems of dendrite and the like, a lithium ion battery using a negative electrode prepared from a carbon material has been produced. However, the lithium ion battery of this construction is associated with a defect that the discharge capacity becomes small.

A variety of materials have been conventionally considered to be potential positive electrode active materials for lithium secondary batteries, and typically included therein are inorganic compounds capable of reversely inserting and eliminating lithium ions. As such inorganic compounds, chalcogen compounds such as oxides and sulfides have been mostly studied, and oxides having high potential, which are capable of achieving a high energy density of batteries, have been found to be particularly promising.

An example of the positive electrode active material comprising the above-mentioned oxide is $LiCoO_2$. $LiCoO_2$ is a 4 V class positive electrode active material reported by Mizushima et al. in 1980 (Mat. Res. Bull., Vol. 15, pp 783–789) and mainly used as a positive electrode active material for lithium secondary batteries which are being used as a main power source of portable equipments currently put to use. Again, a positive electrode active material using such $LiCoO_2$ is inferior in the supply of materials since Co is expensive.

Accordingly, an object of the present invention is to solve the above-mentioned problems and provide a lithium secondary battery having great charge-discharge capacity and superior cycle property. Another object of the present invention is to provide a positive electrode active material for lithium secondary battery and a positive electrode material compound, which are free of the above-mentioned problems and which are economical, superior in suppliability, have great charge-discharge capacity and superior in cycle property.

DISCLOSURE OF THE INVENTION

The present inventors have conducted various studies taking note of the materials of positive and negative electrodes of lithium secondary battery, and found that the above-mentioned problems can be solved by using, as a positive electrode active material, an oxide compound containing at least lithium and nickel, and an Li—Ag—Te alloy as a negative electrode material. In particular, it has been found that the addition of Al and P to an $LiNiO_2$ substance to afford the substance a specific ratio of Ni, Al and P results in the provision of a positive electrode active material superior in capacity and cycle property. The present invention has been made based on this finding.

That is, the present invention relates to a lithium secondary battery comprising a positive electrode composed of a positive electrode active material comprising an oxide compound which comprises at least Li and Ni, and a negative electrode comprising an Li—Ag—Te alloy;

wherein the positive electrode active material is composed of an oxide compound comprising, besides Li and Ni, at least one member selected from the group consisting of Co, Fe, Cr, V, Mn, P, Al, In, Sn, Ti, Cu, Ga, Ag and Zn;

a lithium secondary battery wherein the positive electrode active material is composed of an oxide compound represented by the formula:

wherein $0.80 < w < 1.10$, $0 < x < 0.015$, $0 < y < 0.03$ and $1.8 \leq z \leq 2.2$;

a lithium secondary battery wherein the atomic ratio of the Li—Ag—Te alloy is Li:Ag:Te=10–120:1–20:0.001–2; and a lithium secondary battery wherein the negative electrode is composed of an Li—Ag—M1—M2—Te alloy wherein M1 is at least one member selected from the metals of 3A, 4A and 5A group metals in the periodic table (long period), and M2 is at least one member selected from transition metals except Ag; and in particular, the above-mentioned lithium secondary battery wherein the atomic ratio of the Li—Ag—M1—M2—Te alloy is Li:Ag:M1:M2:Te = 10–120:1–30:1–100:1–30:0.001–2.

The present invention also relates to a positive electrode active material for lithium secondary battery, which is composed of an oxide compound represented by the formula:

$$LiNi_wAl_xP_yO_z$$

wherein $0.80<w<1.10$, $0<x<0.015$, $0<y<0.03$ and $1.8 \leq z \leq 2.2$, a positive electrode material compound comprising the above-mentioned positive electrode active material, a conductive agent and a binder, and a lithium secondary battery comprising the above-mentioned positive electrode active material.

The present invention further relates to a lithium secondary battery comprising a positive electrode composed of a positive electrode active material comprising an oxide compound represented by the formula:

$$LiNi_wAl_xP_yO_z$$

wherein $0.80<w<1.10$, $0<x<0.015$, $0<y<0.03$ and $1.8 \leq z \leq 2.2$, a negative electrode composed of an Li—Ag—M1—M2—Te alloy wherein M1 is at least one member selected from the metals of 3A, 4A and 5A group metals in the periodic table (long period), and M2 is at least one member selected from transition metals except Ag, and a nonaqueous electrolyte.

The positive electrode active material in the present invention is exemplified by those composed of an oxide compound containing at least Li and Ni. Said oxide compound may be a known compound, with preference given to those represented by the following formulas:

$$Li_pNi_qO_2 (0<p \leq 1, 0<q \leq 1) \quad (1)$$

$$LiNi_{1-r}M_rO_2 \ (0<r<1) \ (e.g. \ LiNi_{1-r}Co_rO_2 \ wherein \ 0<r<1) \quad (2)$$

$$Li_sNiM_tO_2 \ (0.1 \leq s \leq 1.2, 0.001 \leq t \leq 0.2) \ (e.g. \ LiNiM_tO_2 wherein \ 0.001 \leq t \leq 0.2) \ and \quad (3)$$

$$Li_uNi_{1-v}M_vO_2 \ (0.1 \leq u \leq 1.2, 0.001 \leq v \leq 0.2) \ (e.g. \ LiNi_{1-v}M_vO_2 \ wherein \ 0.001 \leq v \leq 0.2). \quad (4)$$

In the above formulas, M is one or more metals selected from the group of Co, Fe, Cr, V, Mn, P, Al, In, Sn, Ti, Cu, Ga, Ag and Zn.

Specific examples of the oxide compound include $LiNiO_2$, $LiNi_{0.5}Co_{0.5}O_2$, $LiNi_{0.75}Co_{0.25}O_2$, $LiNi_{0.25}Co_{0.75}O_2$, $LiNi_{0.995}Fe_{0.005}O_2$, $LiNi_{0.99}Cr_{0.01}O_2$, $LiNi_{0.95}V_{0.05}O_2$, $LiNi_{0.92}Mn_{0.08}O_2$, $LiNiP_{0.05}O_2$, $LiNiAl_{0.08}O_2$, $LiNiIn_{0.005}O_2$, $LiNi_{0.95}Sn_{0.05}O_2$, $LiNi_{0.99}Ti_{0.01}O_2$, $LiNi_{0.95}Cu_{0.05}O_2$, $LiNiGa_{0.005}O_2$, $LiNiAg_{0.1}O_2$ and $LiNiZn_{0.15}O_2$.

The above-mentioned oxide compound can be obtained by mixing a predetermined amount of lithium salt (e.g. lithium carbonate, lithium sulfate and lithium nitrate), lithium oxide, or lithium hydroxide and the like, and nickel salt (e.g. nickel carbonate, nickel sulfate, nickel nitrate and nickel oxyhydroxide), nickel oxide or nickel hydroxide and the like, and where necessary, one or more salts (e.g. carbonate, sulfate and nitrate), oxides or hydroxides of metal selected from cobalt, iron, chromium, vanadium, manganese, phosphorus, aluminum, indium, tin, titanium, copper, gallium, silver and zinc, and heat-sintering the mixture at 600–900° C., preferably 650–800° C. The above-mentioned oxide compound can be also prepared using halides besides salts, oxides and hydroxides of metal such as lithium and nickel.

Particularly preferable positive electrode active material is that composed of a novel oxide compound represented by the formula:

$$LiNi_wAl_xP_yO_z$$

wherein $0.80<w<1.10$, $0<x<0.015$, $0<y<0.03$ and $1.8 \leq z \leq 2.2$.

In the oxide compound represented by the above-mentioned formula:

$$LiNi_wAl_xP_yO_z$$

the range of w is $0.80<w<1.10$, preferably $0.95<w<1.05$. When w is in the above-mentioned range, the battery comes to have more superior capacity and cycle property. The range of x is $0<x<0.015$, preferably $0.001<x<0.010$. When x is in the above-mentioned range, the battery comes to have more superior capacity and cycle property. The range of y is $0<y<0.03$, preferably $0.001<y<0.015$. When y is in the above-mentioned range, the battery comes to have more superior capacity and cycle property. The range of z is $1.8 \leq z \leq 2.2$, preferably $1.9 \leq z \leq 2.1$. When z is in the above-mentioned range, the battery suffers less from oxygen deficiency or products from side reaction, and the battery becomes more superior in capacity and cycle property.

The oxide compound represented by the formula:

$$LiNi_wAl_xP_yO_z$$

is obtained by, for example, subjecting a predetermined amount of a mixture of single unit compounds of lithium, nickel, aluminum and phosphorus, or salts thereof (e.g. carbonate, sulfate and nitrate), oxides thereof or hydroxides thereof, and metallic organic compounds to sintering (e.g. heating temperature: about 600–900° C., preferably 650–800° C.), solid phase method, sol-gel method, CVD, PVD, thermal spraying, thermal decomposition or the like.

The respective oxide compounds thus obtained are generally pulverized in mortar, ball mill, hammer mill, jet mill and the like to prepare powders of about 0.1–20 μm in average particle size, and used as positive electrode active materials.

A positive electrode for lithium secondary battery can be prepared as in the following using the above-mentioned positive electrode active material. For example, a binder such as fluorocarbon resin (e.g. polyvinylidene fluoride and polytetrafluoroe thylene), polyethylene and ethylene-propylene-diene polymer (EPDM) and conductive material such as acetylene black, ketzen black and graphite are added to the above-mentioned positive electrode active material to give a positive electrode material compound. This material compound can be formed into a suitable shape and size by an optional method such as doctor blade method, cast forming, compression forming and roll forming to give a positive electrode for lithium secondary battery. In this way, a positive electrode having a layer or tunnel crystal structure allowing entrance and exit of lithium ions can be prepared. In the case of a positive electrode sheet, it preferably has a thickness of 50–500 μm. The binder is preferably a fluorocarbon resin.

When a binder and a conductive agent are added, their contents are about 1–10 parts by weight and about 3–15 parts by weight, respectively, both per 100 parts by weight of the above-mentioned positive electrode active material.

When, for example, doctor blade method is employed, about 10–300 parts by weight of a solvent such as N-methyl-2-pyrrolidone, propylene carbonate, dimethylformamide (DMF), dimethyl sulfoxide (DMSO), xylene and cyclohexane is mixed with 100 parts by weight of the above-mentioned positive electrode material compound to give a positive electrode paste.

The material for the negative electrode of the lithium secondary battery of the present invention may be a conventionally-known material for negative electrodes. Examples thereof include lithium, alloy thereof, carbon material and oxides such as $Nb_2O_5$ and $Fe_2O_3$, with preference given to lithium alloy.

When a lithium alloy is used, it is preferably contained in an atomic proportion of 10% or more, more preferably 10–50%. When the content of lithium is not less than 10%, a decrease in capacity or battery voltage caused by alloying can be suppressed.

Examples of the above-mentioned lithium alloy include Li—Ag—Te alloys, namely, Li—Ag—Te alloys containing at least Li, Ag and Te.

In the Li—Ag—Te alloy, Ag reacts with lithium to form a lithium alloy which functions to absorb or release lithium during charging or discharging. Te forms a stable intermetallic compound $Ag_aTe_b$ with the above-mentioned Ag, and $Li_2Te$ with lithium.

These intermetallic compounds make crystal particles of negative electrode alloy extremely fine, thereby markedly increasing the area of grain boundary. The speed of the diffusion of lithium in the grain boundary reaches not less than several dozen times higher than transgranular speed, so that the lithium electrodeposition is less rate-determined by diffusion of Li, whereby growth of dendrite is suppressed. This also results in an enhanced efficiency of absorption and release of lithium.

These intermetallic compounds accumulate in grain boundary to form a three-dimensional shell. Of the above-mentioned intermetallic compounds $Ag_aTe_b$ and $Li_2Te$, $Ag_aTe_b$ functions as an aggregate to retain the strength of the shell, or a binder of $Li_2Te$. The speed of lithium diffusing in $Li_2Te$ is notably high, so that $Li_2Te$ functions as a high speed diffusion path of lithium, whereby the absorption and release of Li during charging and discharging of the battery proceed through said shell. In addition, the growth of dendrite is suppressed, since said shell is formed from the above-mentioned intermetallic compound. The shell also functions as a barrier of Ag diffusion, whereby fallout of Ag from the electrode during discharge can be prevented. The equivalent electrode potential of $Li_2Te$ and lithium leads to an equivalent electromotive force of a battery comprising $Li_2Te$ and a battery comprising pure lithium.

The above-mentioned Li—Ag—Te alloy preferably has an atomic ratio, Li:Ag:Te of 10–120:1–20:0.001–2, more preferably Li:Ag:Te=10–80:5–20:0.01–0.5.

An atomic ratio of Ag within the above-mentioned range relative to the atomic ratio of Li is preferable in that crystal particles can be made sufficiently fine; sufficient strength of the shell composed of the intermetallic compounds can be achieved; the alloy is easily processed into a sheet; and the battery is afforded a high electromotive force. A Te having an atomic ratio within the above-mentioned range relative to the atomic ratio of Li is preferable in that dendrite can be sufficiently suppressed; crystal particles can be made sufficiently fine; the alloy is easily processed into a sheet; and the battery is afforded a high electromotive force.

Of the above-mentioned Li—Ag—Te alloys, an Li—Ag—M1—M2—Te alloy wherein M1 is at least one member selected from 3A, 4A and 5A group metals in the periodic table (long period), and M2 is at least one member selected from transition metals except Ag, is particularly preferable. In the present invention, transition metal includes 3A–7A, 8, 1B and 2B group metals in the periodic table (long period).

The Li—Ag—Mi—M1—M2—Te alloy has the same advantages as those possessed by the above-mentioned Li—Ag—Te alloy, and respective alloy components of M1 and M2 function as an Li diffusion promoter and a binder, respectively, to more effectively suppress the growth of dendrite and degradation caused by the swelling and contraction of negative electrode along with absorption and release of lithium, as a result of which the cycle life of the battery is prolonged.

M1 in the above-mentioned Li—Ag—M1—M2—Te alloy is preferably one or more members selected from Al, Si, In, Sn, Bi and Pb, more preferably one or more members selected from In, Sn, Bi and Pb. M2 is preferably one or more members selected from Zn, Fe, Co, Ni, Mn, Mo and W, more preferably one or more members selected from Zn, Fe and Ni.

The aforementioned Li—Ag—M1—M2—Te alloy preferably has an atomic ratio of Li:Ag:M1:M2:Te of 10–120:1–30:1–100:1–30:0.001–2, more preferably 10–80:10–30:10–100:1–20:0.01–0.5.

An Li—Ag—M1—M2—Te alloy having an atomic ratio of Ag within the above range relative to the atomic ratio of Li is advantageous in that the battery tends to achieve superior cycle property, high speed of Li diffusion and high electromotive force. When the atomic ratios of M1 and M2 are in the above-mentioned range relative to the atomic ratio of Li, the respective alloy components of M1 and M2 exert sufficient Li diffusion promoting effect and binding effect, thus leading to an improved cycle life, charge-discharge capacity, electromotive force and energy density of the battery. When the atomic ratio of Te is within the above-mentioned range relative to the atomic ratio of Li, the diffusion of Li is promoted and the cycle life of the battery desirably becomes longer.

The lithium alloys such as the above-mentioned Li—Ag—Te alloy and Li—Ag—M1—M2—Te alloy are prepared, for example, according to a suitable known alloying method such as reaction of respective molten alloy components in a predetermined ratios (melting method) and reaction on evaporation.

In the melting method, the alloy components are heated and melted in an inert gas atmosphere for alloying. The heating-melting is preferably performed at a temperature not less than the melting point of Li alloy to allow quick progress of the alloying reaction.

The alloying by evaporation comprises evaporating the alloy components to solidify same on the surface of other kinds of metals. This method allows production of a non-equilibrium phase alloy of high melting point metals which cannot be alloyed by the above-mentioned melting method, and low melting point metals. For evaporation, usable methods include various sputterings such as ion beam sputtering, electron beam evaporation, various ion platings, flash plasma evaporation, pulse plasma evaporation and CVD. When the aforementioned non-equilibrium phase alloy is prepared, a method comprising accelerating atoms or ions in the direction of substrate for evaporation, such as ion plating and sputtering, is preferable.

The method of forming the negative electrode is not particularly limited, and conventional methods can be employed. For example, an optional method such as doctor blade method, cast forming, compression forming and roll forming is employed to form a negative electrode in a known form, such as sheet, tape, thin film and substrate (hereinafter these forms are generally referred to as sheet form). A negative electrode sheet preferably has a thickness of 10–300 µm.

When a metallic material such as lithium and alloy thereof is used as a negative electrode material, for example, a method for forming a negative electrode material into a sheet by hot rolling or hot extrusion, and a method for forming a negative electrode material layer on a collector by hot dipping or low pressure plasma spraying may be used. The latter method of forming a negative electrode material layer on a collector is advantageous for forming a negative electrode sheet wherein such negative electrode material layer can be formed on one or both sides of the collector.

The hot rolling comprises heating the metallic materials for good processability and press-rolling the material, and the hot extrusion comprises heating the metallic materials for good processability and extruding the material. The hot dipping comprises melting the metal in an inert gas and immersing a collector therein for plating, and the low pressure plasma spraying comprises spraying a molten metal on a collector under a reduced pressure inert gas atmosphere (preferably about 10–100 Torr).

A negative electrode sheet can be also formed by, for example, setting negative electrode material components onto a collector sheet by the aforementioned evaporation. In addition, a negative electrode sheet material may be bonded to a collector sheet by a suitable method such as brazing, soldering, ultrasonic welding, spot welding, press-adhesion and roll press-rolling, whereby a negative electrode sheet can be formed.

The collector sheet refers to that composed of suitable conductors such as Ni, Al, Cu, Ag and Fe. Specific examples thereof include metal foil sheet, metal mesh sheet and metal porous sheet.

A carbon material containing no Li can be directly used as a negative electrode, since the positive electrode active material contains Li in the present invention.

Of the above-mentioned positive electrodes and negative electrodes, a combination of a positive electrode comprising a positive electrode active material composed of an oxide compound of the formula:

and a negative electrode composed of an Li—Ag—M1—M2—Te alloy is particularly preferable.

The lithium secondary battery of the present invention comprises an electrolyte. The electrolyte is generally a nonaqueous one, which is exemplified by electrolyte solutions obtained by dissolving various salts conventionally used for lithium batteries, in nonaqueous solvent, and solid electrolyte.

Examples of the above-mentioned salt include $LiClO_4$, $LiBF_4$, $LiPF_4$, $LiPF_6$, $LiAsF_3$, $LiAsF_6$, $LiAlCl_4$, $Li(CF_2SO_2)_2$ and $Li(CF_3SO_2)_2N$. Examples of the nonaqueous solvent include ethylene carbonate, propylene carbonate, dimethyl sulfoxide, sulfolane, γ-butyro-lactone, 1,2-dimethoxyethane, N,N-dimethylformamide, tetrahydrofuran, 1,3-dioxolane, 2-methyltetrahydrofuran, diethyl ether, dimethyl carbonate, diethyl carbonate, methyl formate, methyl acetate, acetonitrile, 3-methyl-2-oxazolidinone, ethylene glycol sulfite, dimethyl sulfite, nitromethane, N-methylpyrrolidinone and mixtures thereof.

The above-mentioned salts are dissolved in the above-mentioned nonaqueous solvent to a concentration of about 0.1–3 moles/L and used as an electrolyte solution. Where necessary, an organic additive such as 2-methylfuran, thiophene, pyrrole and crown ether may be dissolved in said electrolyte solution. The electrolyte solution is generally used upon impregnating or filling a separator such as porous polymer, glass filter and nonwoven fabric with the same.

When the nonaqueous electrolyte is a solid electrolyte, the above-mentioned salts are mixed with a polymer such as polyethylene oxide, polyphosphazene, polyaziridine, polyethylene sulfide, polyvinyl alcohol, and derivatives, mixtures and compounds thereof. Alternatively, the above-mentioned nonaqueous solvent may be incorporated into polymers. Such solid electrolyte may also act as a separator between the positive electrode and the negative electrode.

Figure 1:
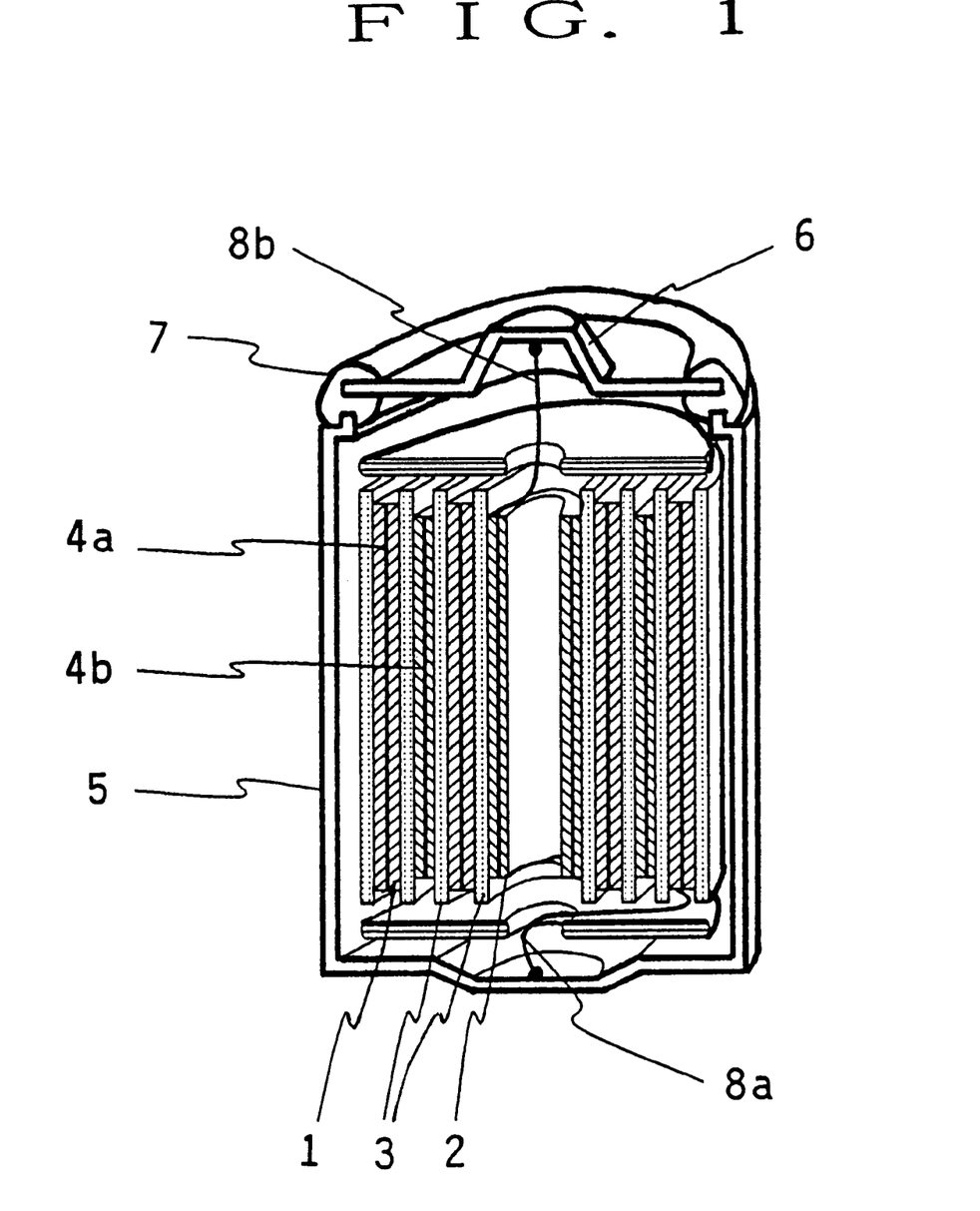
FIG. 1 is a cross section of one embodiment of the lithium secondary battery of the present invention.

Referring to FIG. 1, 1 is a negative electrode tape, 2 is a positive electrode sheet, 3 is a separator, 4a is a negative electrode collector, 4b is a positive electrode collector, 5 is a battery case, 6 is a positive electrode cap, 7 is a gasket, 8a is a negative electrode lead wire, and 8b is a positive electrode lead wire.

Figure 2:
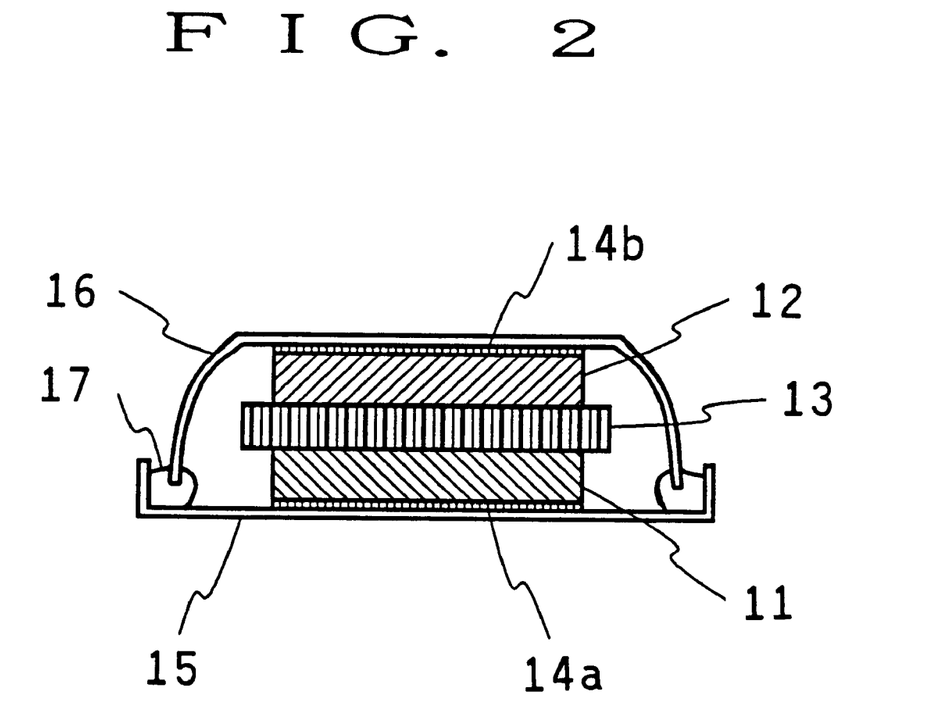
FIG. 2 is a cross section of another embodiment of the lithium secondary battery of the present invention.

In FIG. 2, 11 is a positive electrode, 12 is a negative electrode, 13 is a separator, 14a and 14b are collectors, 15 is a positive electrode can, 16 is a negative electrode cap and 17 is an insulator.

The lithium secondary battery of FIG. 1 has a structure wherein a separator 3, a negative electrode tape 1, a separator 3 and a positive electrode sheet 2 are overlapped in this order, the obtained laminate is wound to form a spiral pattern with the positive electrode sheet 2 located inside thereof and set in the battery case 5, and the battery case 5 is applied with a positive electrode cap 6 and sealed with a gasket 7.

The lithium secondary battery of FIG. 2 has a structure wherein a separator 13 is interposed between the positive electrode 11 and the negative electrode 12, and the positive electrode can 15 pressure-welded to the outside of the positive electrode 11, and the negative electrode cap 16 pressure-welded to the outside of the negative electrode 12 are sealed with an insulator 17.

The shape of the lithium secondary battery of the present invention can be determined as appropriate according to the object of use, and can be a tube type battery as shown in FIG. 1, a coin type battery as shown in FIG. 2, of a button type, square type, sheet type or paper type.

The materials of the elements besides the above-mentioned positive electrode and negative electrode may be conventional ones and are subject to no particular limitation. Examples of the material of the positive electrode cap and positive electrode can include stainless copper and aluminum. Examples of the material of the battery case and negative electrode cap include stainless copper, nickel and nickel-plated iron. Examples of the material of the gasket and insulator include polypropylene and polyethylene. Examples of the material of negative electrode lead wire include nickel and stainless steel, and examples of the material of the positive electrode lead wire include aluminum and stainless steel.

The method for producing the afore-said lithium secondary battery is not subject to particular limitation, and can be prepared by a known method. For example, a winding type tubular lithium secondary battery can be manufactured by winding the above-mentioned positive electrode and the negative electrode with a separator interposed between the two electrodes, housing same in a battery can, injecting an electrolyte solution and applying an insulation sealant at the edge of the battery can. The coin type and button type lithium secondary batteries can be manufactured in the same manner as above except that the positive electrode and the negative electrode with a separator interposed between the two electrodes are housed in a battery can without winding.

The present invention is described in more detail by way of the following Examples, to which the invention is not limited.

EXAMPLE 1

Preparation of Positive Electrode Active Material

Lithium nitrate ($LiNO_3$) and nickel hydroxide ($Ni(OH)_2$) were respectively weighed in an aluminum crucible at an atomic ratio of Li:Ni=1:1 and mixed. Then, the mixture was sintered in an electric furnace at 700° C. for 24 hours in an oxygen stream. The sintered substance thus obtained was determined by a powder X ray diffraction method. As a result, the substance coincided with JCPDS card No. 9-63 and was identified to be $LiNiO_2$ of space group R-3m. This $LiNiO_2$ was pulverized by planet type ball mill to give a positive electrode active material having a particle size of not more than 20 μm.

Preparation of Positive Electrode

The above-mentioned positive electrode active material (90 parts by weight), acetylene black (7 parts by weight) as a conductive material, polyvinilidene fluoride (PVDF, 3 parts by weight) as a binder and N-methyl-2-pyrrolidone (NMP, 97 parts by weight) as a solvent were thoroughly mixed to give a paste. The paste was coated on one side of a 20 μm thick, 39.5 mm wide aluminum sheet, dried in an electric furnace at 200° C., from which an electrode sheet was continuously prepared. The same paste was coated on the other side of the sheet and dried to make the total thickness 400 μm. The obtained electrode sheet was cut into a 400 mm long piece and press-rolled to make the thickness 200 μm. A 20 mm long coating layer was peeled off from one side and a lead wire was welded thereto. The electrode was dried in a vacuum drier at 120° C. for 3 hours to give a positive electrode sheet.

Preparation of Negative Electrode

A 2 μm thick Ni plating layer and then a 0.5 μm thick Ag plating layer were formed on the entirety of a 41 mm wide, 10 μm thick copper tape by electric plating, and a 20 μm thick Li—Ag—Te alloy layer was formed on the obtained tape by melt-plating. As the Li—Ag—Te alloy, used was a mixture of the respective components mixed at an atomic ratio of Li:Ag:Te=90:10:0.1. For melt plating, the starting material mixed at the above-mentioned atomic ratio was weighed in a stainless container, melted at 250° C. in an argon atmosphere and subjected to plating using a squeezing type film thickness controller.

The obtained tape of the starting material was cut into 420 mm long tape and used as a negative electrode tape.

Preparation of Battery

A size AA tubular lithium secondary battery as shown in FIG. 1 was prepared in the following manner using the above-mentioned negative electrode tape, a 25 μm thick separator composed of a film with fine pores made from polypropylene, and the above-mentioned positive electrode sheet.

A separator 3, a negative electrode tape 1, a separator 3 and a positive electrode sheet 2 were overlapped in this order, and wound to form a spiral pattern with the positive electrode sheet 2 located inside thereof. The spiral product was placed in a size AA nickel-plated Fe battery case 5. Along therewith, a negative electrode lead wire 8a connected to a negative electrode collector 4a in the negative electrode tape 1, which collector being composed of a copper tape applied with silver and nickel platings, was welded to the inside bottom surface of the above-mentioned battery case 5, and a positive electrode lead wire 8b connected to a positive electrode collector 4b in the positive electrode sheet 2, which collector being composed of aluminum sheet, was welded to the positive electrode cap 6 in the above-mentioned battery case 5. Then, an electrolyte solution (3 ml) was injected into the battery case 5. A positive electrode cap 6 was applied onto the battery case 5, and the battery was sealed with a gasket 7. As the electrolyte solution, a solution obtained by dissolving one mole of $LiPF_6$ in a mixture of ethylene carbonate and diethyl carbonate (volume ratio 1:1) was used.

The above-mentioned size AA lithium secondary battery allows, upon conversion of the chemical energy produced inside, use of electric energy from the both terminals at the positive electrode cap 6 and the bottom surface of the battery case 5.

Comparative Example 1

In the same manner as in Example 1 except that the below-noted positive electrode and negative electrode were used, a size AA lithium secondary battery was prepared.

Preparation of Positive Electrode

In the same manner as in Example 1, a positive electrode sheet was prepared except that the length was set to 300 mm.

Preparation of Negative Electrode

Natural graphite (93 parts by weight), PVDF (7 parts by weight) as a binder, and NMP (93 parts by weight) as a solvent were thoroughly mixed to give a paste. In the same manner as in Example 1 for preparation of a positive electrode sheet, a 180 μm thick, 41 mm wide and 300 mm long negative electrode sheet was prepared, except that a 10 μm thick copper sheet was used instead of the aluminum collector sheet.

Evaluation Test 1

Using the respective batteries obtained in Example 1 and Comparative Example 1 above, a charge-discharge test was repeated as noted below. Charging was done according to the constant voltage method using 500 mA current for 3 hours wherein the highest voltage limit was 4.2 V. Discharging was done until the lowest limit voltage became 2.75 V using 100 mA current, and the capacity of each battery was determined. A combination of one charging and one discharging was considered one cycle and the test included 50 cycles thereof.

Figure 3:
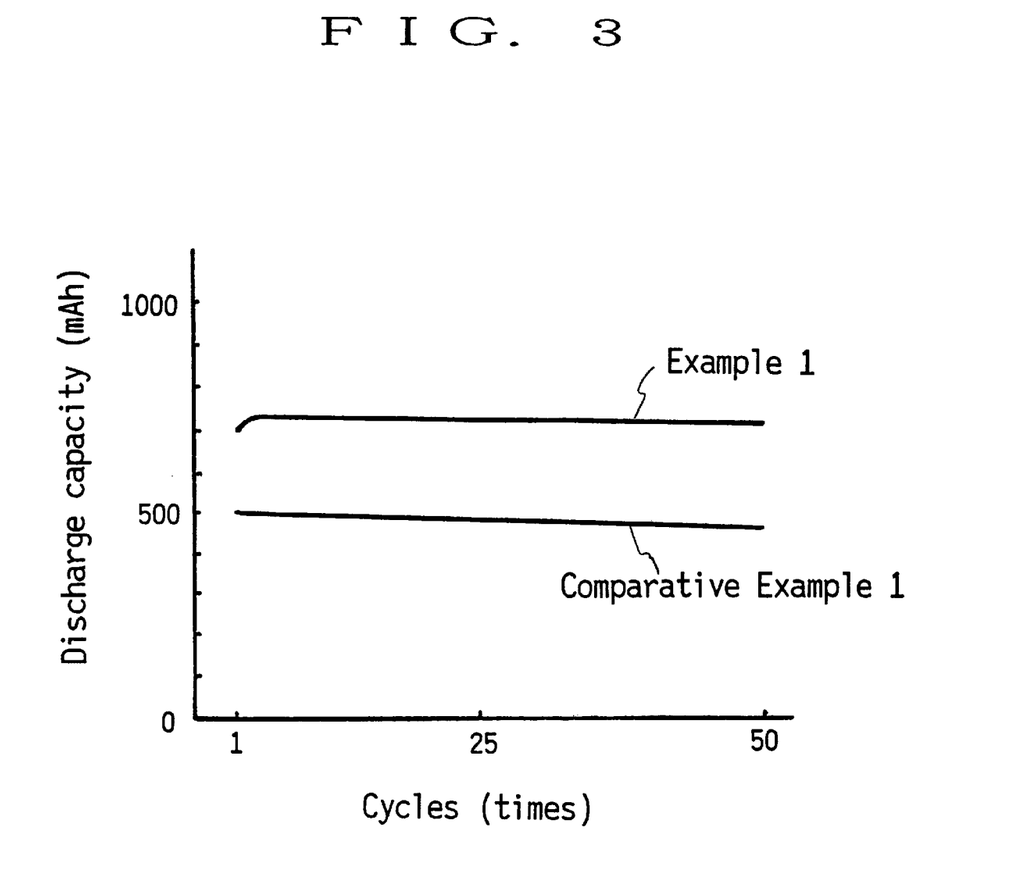
FIG. 3 shows the relationship between the number of cycles and discharge capacity in the charge-discharge test with regard to the respective batteries obtained in Example 1 and Comparative Example 1.

The test results are shown in FIG. 3. As is evident from this graph, the battery of Example 1 showed higher capacity than did the battery of Comparative Example 1 using a carbon material for the negative electrode. That is, the discharge capacity of the battery of Example 1 was about 40% higher than that possessed by the battery of Comparative Example 1. The discharge capacity of the battery of Example 1 scarcely changed even after 50 cycles of repetitive charging and discharging. Although not shown in the Figure, the average discharge voltage then was 3.6 V in Example 1 and 3.5 V in Comparative Example 1, showing higher discharge voltage of the battery of Example 1. After 50 cycles of the above-mentioned charge-discharge test, the battery of Example 1 was disassembled to examine the occurrence of dendrite in the negative electrode. As a result, no dendrite was found.

EXAMPLES 2–17

In the same manner as in Example 1 except that the positive electrode active material as shown in Table 1 was used for preparing a positive electrode, batteries were prepared. The positive electrode active materials as used in Examples 5–17 were easily pulverized after sintering, as compared with the positive electrode active material of Example 1, thus enabling notable shortening of the preparation time of the positive electrode.

TABLE 1

| Ex. No. | Positive electrode active material | Material of positive electrode active material |
|---|---|---|
| 2 | $LiNi_{0.75}Co_{0.25}O_2$ | lithium nitrate, nickel hydroxide, basic cobalt carbonate |
| 3 | $LiNi_{0.5}Co_{0.5}O_2$ | same as above |
| 4 | $LiNi_{0.25}Co_{0.75}O_2$ | same as above |
| 5 | $LiNi_{0.995}Fe_{0.005}O_2$ | lithium nitrate, nickel hydroxide, $Fe(OH)_3$ |
| 6 | $LiNi_{0.99}Cr_{0.01}O_2$ | lithium nitrate, nickel hydroxide, $Cr(NO_3)_3 \cdot 9H_2O$ |
| 7 | $LiNi_{0.95}V_{0.05}O_2$ | lithium nitrate, nickel hydroxide, $NH_4VO_3$ |
| 8 | $LiNi_{0.92}Mn_{0.08}O_2$ | lithium nitrate, nickel hydroxide, $MnCO_3$ |
| 9 | $LiNiP_{0.05}O_2$ | lithium nitrate, nickel hydroxide, phosphoric acid |
| 10 | $LiNiAl_{0.08}O_2$ | lithium nitrate, nickel hydroxide, $Al(NO_3)_3 \cdot 9H_2O$ |
| 11 | $LiNiIn_{0.005}O_2$ | lithium nitrate, nickel hydroxide, $In_2O_3$ |
| 12 | $LiNi_{0.95}Sn_{0.05}O_2$ | lithium nitrate, nickel hydroxide, $SnO_2$ |
| 13 | $LiNi_{0.99}Ti_{0.01}O_2$ | lithium nitrate; nickel hydroxide, $Ti(O-i-C_3H_7)_4$ |
| 14 | $LiNi_{0.95}Cu_{0.05}O_2$ | lithium nitrate, nickel hydroxide, $Cu(NO_3)_2 \cdot 3H_2O$ |
| 15 | $LiNiGa_{0.005}O_2$ | lithium nitrate, nickel hydroxide, $Ga(NO_3)_3 \cdot 9H_2O$ |
| 16 | $LiNiAg_{0.1}O_2$ | lithium nitrate, nickel hydroxide, $AgNO_3$ |
| 17 | $LiNiZn_{0.15}O_2$ | lithium nitrate, nickel hydroxide, $Zn(NO_3)_2 \cdot 6H_2O$ |

Figure 4:
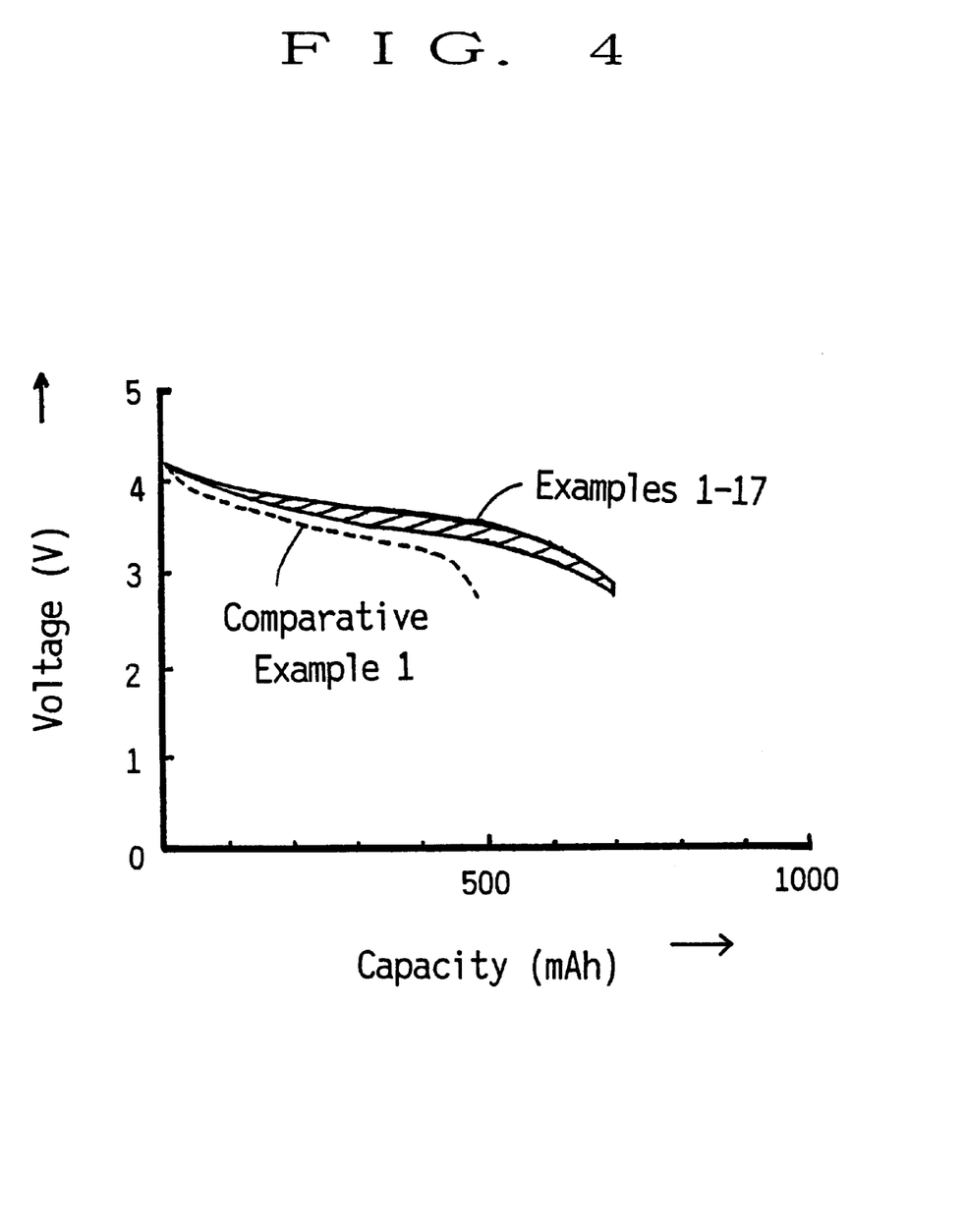
FIG. 4 shows discharge property curves with regard to the respective batteries obtained in Examples 1–17 and Comparative Example 1.

The discharge property of the batteries of Examples 1–17 and Comparative Example 1 is shown in FIG. 4. The discharge property of Examples 1–17 is expressed by embracing all curves obtained in these Examples.

As is evident from FIG. 4, the average discharge voltage of the respective batteries of Examples was about 3.6 V and the batteries can be incorporated into the equipments already in use.

Comparative Example 2

In the same manner as in Example 1 except that pure lithium was used for the negative electrode, a size AA tubular lithium secondary battery was prepared.

The battery of Comparative Example 2 was subjected to 50 cycles of charge-discharge test and disassembled to examine the negative electrode. As a result, dendrite was found.

The lithium secondary battery of the present invention comprises a positive electrode composed of a positive electrode active material comprising an oxide compound containing at least lithium and nickel. Consequently, the positive electrode has an $\alpha$-$NaFeO_2$ type crystal structure which enables repetition of reversible release and absorption of lithium ions by charge-discharge of the battery to result in high energy density, as in the case of a known oxide compound ($LiCoO_2$) of lithium and cobalt which has been known to have high energy density. The negative electrode composed of a solid-solution type alloy containing Li—Ag—Te alloy functions to absorb and release Li during charging and discharging to promote diffusion of Li during charging and discharging, and suppresses growth of dendrite.

In other words, since the lithium secondary battery of the present invention comprises, in combination, a high capacity positive electrode composed of a positive electrode active material comprising an oxide compound containing at least lithium and nickel and a negative electrode composed of an Li—Ag—Te alloy capable of suppressing growth of dendrite, the battery has high charge-discharge capacity, high energy density and superior cycle property with less degradation caused by repetitive charging and discharging.

EXAMPLE 21

Preparation of Positive Electrode Active Material

Lithium hydroxide monohydrate ($LiOH \cdot H_2O$), nickel hydroxide [($Ni(OH)_2$], aluminum hydroxide [$Al(OH)_3$] and lithium phosphate [$Li_3PO_4$] were weighed to satisfy an atomic ratio of Li:Ni:Al:P=1:0.99:0.002:0.005 and thoroughly mixed in a mortar. The mixture was placed in an aluminum crucible and subjected to heat treatment in an electric furnace at 700° C. for 24 hours in an oxygen stream. The substance obtained was pulverized in a mortar, classified by passing through a sieve to give a powdery positive electrode active material having a particle size of not more than 20 $\mu$m.

EXAMPLES 22–34

In the same manner as in Example 21 except that the atomic ratio of Li, Ni, Al and P was varied as shown in Table 2, powdery positive electrode active materials were prepared.

Comparative Example 11

In the same manner as in Example 21 except that lithium hydroxide monchydrate ($LiOH \cdot H_2O$) and nickel hydroxide [$Ni(OH)_2$] were weighed to satisfy an atomic ratio of Li:Ni=1:1, a powdery positive electrode active material was prepared.

Comparative Examples 12–17

In the same manner as in Example 21 except that the atomic ratio of Li, Ni, Al and P was varied as shown in Table 2, powdery positive electrode active materials were prepared.

Comparative Example 18

Lithium hydroxide monohydrate and nickel powder were mixed in amounts as shown in Table 2 and subjected to heat treatment at 750° C. for 12 hours in an oxygen atmosphere. The substance obtained was pulverized and subjected to a heat treatment under the same conditions. Thereafter, the same steps as in Example 21 were followed to give a powdery positive electrode active material.

Comparative Example 19

Lithium carbonate and cobalt carbonate were mixed in amounts as shown in Table 3 and subjected to heat treatment at 900° C. for 20 hours in atmosphere. The substance obtained was pulverized and subjected to a heat treatment under the same conditions. Thereafter, the same steps as in Example 21 were followed to give a powdery positive electrode active material.

Comparative Example 20

Lithium carbonate, nickel oxide, stannic oxide and scandium oxide were mixed in amounts as shown in Table 3 and subjected to sintering at 650° C. for 5 hours in atmosphere, followed by sintering at 850° C. for 12 hours. Thereafter, the same steps as in Example 21 were followed to give a powdery positive electrode active material.

Comparative Example 21

In the same manner as in Comparative Example 20 except that lithium carbonate, aluminum oxide, cobalt oxide and scandium oxide were mixed in amounts as shown in Table 3, a powdery positive electrode active material was obtained.

Comparative Example 22

In the same manner as in Comparative Example 20 except that lithium carbonate, cobalt oxide, stannic oxide, scandium oxide and manganese dioxide were mixed in amounts as shown in Table 3, a powdery positive electrode active material was obtained.

The atomic ratio of O in the positive electrode active materials as obtained in Examples 21–34 and Comparative Examples 11–22 was within the range of from 1.8 to 2.2 when Li was 1.

Preparation of Positive Electrode

Using the positive electrode active materials obtained in Examples 21–34 and Comparative Examples 11–22, positive electrodes were prepared as in the following. A positive electrode active material (90 parts by weight), acetylene black (7 parts by weight) as a conductive material, polyvinilidene fluoride (PVDF, 3 parts by weight) as a binder and N-methyl-2-pyrrolidone (NMP, 97 parts by weight) as a solvent were mixed and stirred to give a paste. The paste was coated on a 20 $\mu$m thick collector (aluminum sheet) with a doctor blade, dried and press-rolled to give 100 $\mu$m thick electrode sheet. A 12 mm diameter disc was punched out from the electrode sheet and used as a positive electrode.

Preparation of Test Batteries

The above-mentioned positive electrode 11, a 25 $\mu$m thick, 16 mm diameter disc separator 13 composed of a polypropylene film with fine pores, and a negative electrode 12 obtained by punching out a 15 mm diameter disc from a 0.3 mm thick lithium sheet were overlapped in this order and set in a positive electrode can 15. Note that 14a and 14b are collectors of positive electrode 11 and negative electrode 12, respectively. Then, an electrolyte solution obtained by dissolving 1 mole/L of lithium perchlorate in propylene carbonate was injected into the positive electrode can 15. A negative electrode cap 16 was applied to the positive electrode can 15, and the battery was sealed with an insulator 17 (insulating gasket) to give a coin type lithium secondary battery similar to the one shown in FIG. 2.

Evaluation Test 2

Using the test batteries prepared using the positive electrode active materials obtained in Examples 21–34 and Comparative Examples 11–22, charging and discharging were performed as in the following. The batteries were charged to 4.2 V using a 0.5 mA constant current. After one hour's intermission, the batteries were discharged to 2.75 V using a 0.5 mA constant current, followed by intermission for one hour. Such set of charging and discharging was taken as one cycle and charging and discharging were repeated 100 cycles. The initial discharge capacity and capacity retention ratio after 100 cycles of charging and discharging (ratio of discharge capacity after 100 cycles relative to the initial discharge capacity) were determined. The results are shown in Tables 2 and 3. In Tables 2 and 3, the initial discharge capacity is that per 1 g of positive electrode active material.

EXAMPLE 35

Using the positive electrode active material obtained in Example 21 a positive electrode was prepared as above. A negative electrode was prepared in the following manner. In the same manner as in the preparation of test battery above, a lithium secondary battery was prepared.

Preparation of Negative Electrode

A mixture weighed to satisfy an atomic ratio of Li:Ag:In:Zn:Fe:Te=60:15:45:38:4:1 was heated to 800° C. in a highly pure Ar atmosphere (dew point temperature −60° C.) and melted for alloying. The alloy was pulverized to give a powdery negative electrode active material, from which a negative electrode was prepared in the following manner. The above-mentioned negative electrode active material (92 parts by weight), acetylene black (5 parts by weight) as a conductive material, ethylene-propylene-diene polymer (3 parts by weight) as a binder and xylene (97 parts by weight) as a solvent were mixed and stirred to give a paste. The paste was coated on a 10 $\mu$m thick collector (Cu sheet) with a doctor blade, dried and press-rolled to give a 50 $\mu$m thick electrode sheet. A 15 mm diameter disc was punched out from the electrode sheet and used as a negative electrode.

EXAMPLE 36

In the same manner as in Example 35 except that a mixture was weighed to have an atomic ratio of Li:Ag:Zn:Fe:Si:Te=60:15:70:4:9:1 and alloyed by heating the mixture to 750° C. in a similar atmosphere (highly pure Ar atmosphere), a negative electrode and lithium secondary battery were prepared.

EXAMPLE 37

In the same manner as in Example 35 except that a mixture was weighed to have an atomic ratio of Li:Ag:Al:Si:Mn:Te=60:15:20:9:4:1 and alloyed by heating the mixture to 750° C. in a similar atmosphere (highly pure Ar atmosphere), a negative electrode and a lithium secondary battery were prepared.

EXAMPLES 38–41

In the same manner as in Example 35 except that the compositions were as shown in Table 4, negative electrodes and lithium secondary batteries were prepared.

Evaluation Test 3

Using the test batteries obtained in Examples 35–41, the electromotive force was determined by a two-terminal network method. In addition, the above-mentioned test batteries were subjected to charging and discharging in the same manner as in the aforementioned Evaluation test 2 to examine initial discharge capacity and capacity retention ratio after 100 cycles of charge-discharge. Energy density at 50 cycles of charge-discharge was also determined. The results are shown in Table 4.

TABLE 2

| | Positive electrode active material Atomic ratio | | | | Lithium secondary battery | |
|---|---|---|---|---|---|---|
| | Li | Ni | Al | P | Initial discharge capacity (mAh/g) | Cycle property* (%) |
| Ex. 21 | 1 | 0.99 | 0.002 | 0.005 | 168 | 98 |
| Ex. 22 | 1 | 1.00 | 0.002 | 0.005 | 156 | 98 |
| Ex. 23 | 1 | 1.05 | 0.002 | 0.005 | 132 | 95 |
| Ex. 24 | 1 | 0.97 | 0.002 | 0.005 | 157 | 97 |
| Ex. 25 | 1 | 0.95 | 0.002 | 0.005 | 151 | 97 |
| Ex. 26 | 1 | 0.90 | 0.002 | 0.005 | 144 | 95 |
| Ex. 27 | 1 | 0.85 | 0.002 | 0.005 | 121 | 93 |
| Ex. 28 | 1 | 0.99 | 0.001 | 0.005 | 150 | 97 |
| Ex. 29 | 1 | 0.99 | 0.005 | 0.005 | 148 | 97 |
| Ex. 30 | 1 | 0.99 | 0.010 | 0.005 | 120 | 95 |
| Ex. 31 | 1 | 0.99 | 0.002 | 0.002 | 153 | 97 |
| Ex. 32 | 1 | 0.99 | 0.002 | 0.007 | 155 | 98 |
| Ex. 33 | 1 | 0.99 | 0.002 | 0.010 | 144 | 98 |
| Ex. 34 | 1 | 0.99 | 0.002 | 0.020 | 120 | 95 |
| Com. Ex. 11 | 1 | 1.00 | — | — | 135 | 80 |
| Com. Ex. 12 | 1 | 1.10 | 0.002 | 0.005 | 77 | 88 |
| Com. Ex. 13 | 1 | 0.80 | 0.002 | 0.005 | 53 | 92 |
| Com. Ex. 14 | 1 | 0.99 | — | 0.005 | 135 | 80 |
| Com. Ex. 15 | 1 | 0.99 | 0.015 | 0.005 | 83 | 89 |
| Com. Ex. 16 | 1 | 0.99 | 0.002 | — | 140 | 71 |
| Com. Ex. 17 | 1 | 0.99 | 0.002 | 0.030 | 65 | 86 |
| Com. Ex. 18 | 1 | 1 | — | — | 101 | 30 |

Note
*capacity retention ratio after 100 cycles of charge-discharge

TABLE 3

| | Positive electrode active material Atomic ratio | | | | | | | Lithium secondary battery | |
|---|---|---|---|---|---|---|---|---|---|
| | Li | Ni | Al | Co | Sn | Sc | Mn | Initial discharge capacity (mAh/g) | Cycle property* (%) |
| Com. Ex. 19 | 1 | — | — | 1 | — | — | — | 115 | 93 |
| Com. Ex. 20 | 1.05 | 0.95 | — | — | 0.042 | 0.002 | — | 20 | 78 |
| Com. Ex. 21 | 1.05 | — | 0.084 | 0.95 | — | 0.002 | — | 106 | 56 |
| Com. Ex. 22 | 1.05 | — | — | 0.95 | 0.042 | 0.001 | 0.001 | 108 | 63 |

Note
*capacity retention ratio after 100 cycles of charge-discharge

TABLE 4

| | Negative electrode active material | | Lithium secondary battery | | | |
|---|---|---|---|---|---|---|
| | Composition of alloy | Composition ratio (atomic ratio) | Electromotive force (V) | Energy density (Wh/kg) | Initial discharge capacity (mAh/g) | Cycle property* (%) |
| Ex. 35 | Li—Ag—In—Zn—Fe—Te | 60:15:45:38:4:1 | 4.1 | 170 | 350 | ≧90 |
| Ex. 36 | Li—Ag—Zn—Fe—Si—Te | 60:15:70:4:9:1 | 4.0 | 165 | 340 | ≧90 |
| Ex. 37 | Li—Ag—Al—Si—Mn—Te | 60:15:20:9:4:1 | 3.9 | 175 | 360 | ≧90 |
| Ex. 38 | Li—Ag—Sn—Fe—Te | 60:24:36:4:1 | 4.0 | 165 | 340 | ≧90 |
| Ex. 39 | Li—Ag—In—Fe—Te | 60:24:40:14:1 | 4.0 | 166 | 345 | ≧90 |
| Ex. 40 | Li—Ag—Sn—Zn—Fe—Te | 60:24:40:2:2:1 | 4.0 | 171 | 320 | ≧90 |
| Ex. 41 | Li—Ag—Sn—Si—Fe—Te | 60:24:40:2:2:1 | 4.0 | 162 | 330 | ≧90 |

Note
*capacity retention ratio after 100 cycles of charge—discharge

The positive electrode active material for lithium secondary battery of the present invention composed of an oxide compound of the formula:

$$LiNi_wAl_xP_yO_z$$

wherein $0.80<w<1.10$, $0<x<0.015$, $0<y<0.03$ and $1.8 \leq z \leq 2.2$ is economical and superior in the supply of starting materials as compared with the positive electrode active material using $LiCoO_2$ and the like. Using the inventive positive electrode active material, a lithium secondary battery superior in capacity and cycle property can be obtained.

Since the lithium secondary battery of the present invention comprises a positive electrode comprising the above-mentioned positive electrode active material, it has high capacity, superior cycle property and can be produced stably at low costs.

What is claimed is:

1. A lithium secondary battery comprising a positive electrode composed of a positive electrode material composed of an oxide compound represented by the formula:

$$LiNi_wAl_xP_yO_z$$

wherein $0.80<w<1.10$, $0<x<0.015$, $0<y<0.03$ and $1.8 \leq z \leq 2.2$, and a negative electrode comprising an Li—Ag—Te alloy.

2. A positive electrode active material for lithium secondary battery, which is composed of an oxide compound represented by the formula:

$LiNi_wAl_xP_yO_z$ wherein $0.80<w<1.10$, $0<x<0.015$, $0<y<0.03$ and $1.8 \leq z \leq 2.2$.

3. A positive electrode material compound comprising a positive electrode active material composed of an oxide compound represented by the formula:

$LiNi_wAl_xP_yO_z$ wherein $0.80<w<1.10$, $0<x<0.015$, $0<y<0.03$ and $1.8 \leq z \leq 2.2$, a conductive agent and a binder.

4. A lithium secondary battery comprising a positive electrode active material composed of an oxide compound represented by the formula:

$LiNi_wAl_xP_yO_z$ wherein $0.80<w<1.10$, $0<x<0.015$, $0<y<0.03$ and $1.8 \leq z \leq 2.2$.

5. A lithium secondary battery comprising a positive electrode composed of a positive electrode active material comprising an oxide compound represented by the formula:

$LiNi_wAl_xP_yO_z$ wherein $0.80<w<1.10$, $0<x<0.015$, $0<y<0.03$ and $1.8 \leq z \leq 2.2$, a negative electrode composed of an Li—Ag—M1—M2—Te alloy wherein M1 is at least one member selected from 3A, 4A and 5A group metals in the periodic table (long period), and M2 is at least one member selected from transition metals except Ag, and a nonaqueous electrolyte.

* * * * *